3,574,745
CHLOROPHENOXYACETAMIDE HERBICIDES AND PREPARATION THEREOF

Edwin D. Little, Convent Station, N.J., assignor to Allied Chemical Corporation, New York, N.Y.
No Drawing. Filed Aug. 27, 1968, Ser. No. 755,747
Int. Cl. C07c 103/30
U.S. Cl. 260—559               7 Claims

ABSTRACT OF THE DISCLOSURE

N - (2 - chloroethyl)-chlorophenoxyacetamides are prepared by condensing 2-oxazolidone with a di- or trichlorophenoxyacetyl chloride at a pH less than about 7.0. The compounds are useful as herbicides.

Cross-reference to related application

This application discloses subject matter related to the invention of Edwin D. Little entitled "Chlorophenoxyacetyloxazolidone Herbicides and Preparation Thereof," filed on even date with the instant application.

BACKGROUND OF THE INVENTION

This invention relates to novel chlorophenoxyacetamides; in particular it relates to N-(2-chloroethyl)-chlorophenoxyacetamides, their preparation and use as herbicides.

The need to control undesirable plant growth for efficient cultivation of crops has given rise to the development of a great variety of herbicidal agents. However, many of the chemical herbicides available heretofore do not have adequate potency or selectivity to afford optimum results. An effective herbicide must be highly effective against undesirable plants while remaining harmless with respect to the plant being cultivated, such as corn, wheat or cotton.

SUMMARY OF THE INVENTION

The novel compounds of the instant invention are di- and trichlorophenoxyacetamides of the formula:

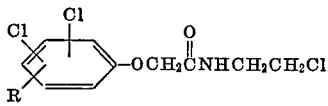

wherein R is hydrogen or chlorine. These compounds, which are prepared by reacting 2-oxazolidone with a di- or trichlorophenoxyacetyl chloride preferably at a pH less than about 7.0, are useful as herbicides.

DETAILED DESCRIPTION OF THE INVENTION

Preparation of the instant compounds is unexpectedly accomplished by reacting 2-oxazolidone with an appropriate phenoxyacetyl chloride, preferably at a pH less than about 7.0, according to the following sequence:

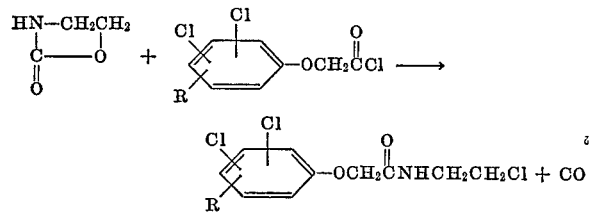

Approximately equimolar amounts of the two substrates will be used, although an excess of either might be used to achieve a higher yield with respect to the other.

The reaction may be conducted in an inert solvent although it is more convenient not to use solvent. For this purpose, the reaction is conducted above the melting point of 2-oxazolidone, i.e. about about 89° C., and the phenoxyacetyl chloride is added to the molten oxazolidone. Preferably, the reaction will be conducted at a temperature within the range of about 89–150° C., and more preferably 89–100° C. Reaction times as short as about one hour or less have been found to be adequate, although longer reaction times may be used if desired.

Atmospheric pressure is normally used for the reaction, although subatmospheric conditions might be employed to facilitate evolution of the carbon dioxide which is coproduced with the instant compounds.

The reaction might be conducted in an inert solvent, if desired, such as chloroform, and carbon tetrachloride. Consideration regarding reaction temperature, time and pressure specified hereinbefore are appropriate for this purpose, although somewhat lower temperatures might be used if desired.

It has been found that it is preferable that the reaction be conducted in the absence of base in order to obtain the desired product, i.e., at a pH less than about 7.0. Presence of a base or acid acceptor in the reaction medium results in a competing reaction product. More preferably the instant reaction is conducted below a pH of about 3.0.

Substrate materials are readily available by procedures taught in the prior art. For example, 2-oxazolidone might be prepared by heating tris(2-hydroxyethyl)isocyanurate to 150–250° C. the manner taught by U.S. Patent 3,108,-115, and the various phenoxyacetyl chlorides are available by treating the corresponding phenoxyacetic acid with thionyl chloride, which acid is in turn prepared by reacting the corresponding phenol with monochloroacetic acid.

The instant compounds have been found to be unexpectedly effective herbicides in that they are very harmful to plants normally considered undesirable, such as rape and broadleafed weeds, while being harmless toward such plants as soybeans, corn, wheat and cotton. N-(2-chloroethyl) - 2,4 - dichlorophenoxyacetamide is the preferred compound for this purpose.

Normally, the instant compounds will be used as the active ingredient in an herbicidal composition, although they might also be used without a carrier. Various diluents and carriers may be employed and the percent of active ingredient may be varied. Although compositions with less than about 0.5% by weight of active ingredients may be used, it is preferable to use compositions containing at least about 1.0% of active ingredient because otherwise the amount of carrier becomes excessively large. Activity increases with the concentration of active ingredient, which may be 10, 50, 95% or even higher.

The amount of composition which is applied for effective herbicidal action is dependent upon considerations such as the type of undesirable plant to be killed, the density of undesirable plants, and soil and climatic conditions. Usually, sufficient composition will be applied to provide about 2–4 pounds of active ingredient per acre.

The instant insecticidal compositions may be in the form of a solution, with the solvent being selected from acetone, benzene, petroleum fractions and the like. These solutions can be applied to the plants in a direct manner such as by spraying, sprinkling, drenching, etc. Water suspensions can also be applied in this manner, with dispersing and emulsifying agents such as sodium alkyl sulfates and sulfonates and the like.

Application can also be achieved by dusting a powder in which the active ingredient is dispersed. Suitable carriers include finely powdered material such as clays, fullers earth, talc, etc.

The instant compounds may constitute the sole active ingredient in the herbicidal compositions, but they might be effectively used in combination with other active ingredients, such as other herbicides, insecticides and other plant treating agents.

The following examples are provided to more fully illustrate the instant invention. They are provided for illustrative purposes only and are not to be construed as limiting the scope of the instant invention, which is defined by the appended claims.

EXAMPLE I

N-(2-chloroethyl)-2,4-dichlorophenoxyacetamide 2-oxazolidone (8.5 g., 0.097 mole) was melted over a steam bath, and to the fused material was added 2,4-dichlorophenoxyacetyl chloride (24 grams, 0.1 mole). The mixture was heated over the steam bath for 55 minutes, after which time it was mixed with ice water. The precipitated solid was separated by filtration, washed with two portions of water and then thoroughly mixed with water in a blender. The crude material was then recrystallized from alcohol to afford the desired product as a white solid, 10 g. (36%), M.P. 100–102° C.

*Analysis.*—Calc'd for $C_{10}H_{10}Cl_3NO_2$ (percent): C, 42.5; H, 3.54; N, 4.96. Found (percent): C, 42.9; H, 3.61; N, 4.55.

EXAMPLE II

The procedure of Example 5 is repeated wherein an equivalent amount of appropriate phenoxyacetyl chloride is used to afford the following products:

N-(2-chloroethyl)-2,5-dichlorophenoxyacetamide
N-(2-chloroethyl)-2,6-dichlorophenoxyacetamide
N-(2-chloroethyl)-3,5-dichlorophenoxyacetamide
N-(2-chloroethyl)-2,4,5-trichlorophenoxyacetamide
N-(2-chloroethyl)-2,4,6-trichlorophenoxyacetamide
N-(2-chloroethyl)-3,4,5-trichlorophenoxyacetamide

EXAMPLE III

Herbicidal activity

The following crop species and weed species were planted in metal flats (12 x 8.5 x 4 inches) in greenhouse potting soil containing one-third mixed clay and sand, one-third mushroom soil, and one-third peat moss. The pH of the soil was 6.8–7.2.

Crop species

Corn, *Zea mays*, Hybrid U.S. 13
Wheat, *Triticum vulgare*, variety Thorne
Cotton, *Gossypium hirsutum*, variety Delta Pine Lane Fox, No. 20
Soybean, *Soja wax*, variety Wilson Weed species Ryegrass
Rape Each flat received a volume of spray equal to 80 gallons per acre of an acetone solution of N-(2-chloroethyl)-2,4-dichlorophenoxyacetamide. The concentration of the solution was adjusted to provide application of 2 and 4 pounds of active ingredient per acre. Immediately after spraying, the test flats were placed in aluminum trays and were irrigated until the surface of the soil in the flat was uniformly moist (at field capacity). Additional sub-irrigation was provided as needed to maintain moisture. No surface irrigation was applied.

The flats were sprayed within one day after seeding in preemergence tests, and 8–10 days after seeding in the postemergence tests. Results were observed 14 days after spraying.

The effect of the herbicide was evaluated in terms of the injury rating index scale, ranging from 0 to 10 as follows:

0—No apparent injury
1,2,3—Slight injury
4,5,6—Moderate injury
7,8,9—Severe injury (plants will die)
10—Plants were dead.

An injury rating of 3 is the maximum tolerated for crops and a rating of 7 is the minimum acceptable on weed plants.

| Plant | Injury rating | | | |
|---|---|---|---|---|
| | Preemergence | | Postemergence | |
| | (1) | (2) | (1) | (2) |
| Corn | 1 | 0 | 0 | 0 |
| Cotton | 2 | 3 | 9 | 9 |
| Wheat | 0 | 0 | 0 | 0 |
| Soybean | 0 | 1 | 9 | 7 |
| Ryegrass | 0 | 0 | 0 | 0 |
| Rape | 10 | 9 | 10 | 10 |

[1] 4 pounds of active ingredient per acre.
[2] 2 pounds of active ingredient per acre.

What is claimed is:
1. A compound of the formula:

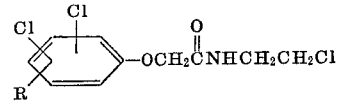

wherein R is hydrogen or chlorine.
2. A compound of claim 1 wherein R is hydrogen.
3. The compound of claim 1 wherein said compound is N-(2-chloroethyl)-2,4-dichlorophenoxyacetamide.
4. A process for the preparation of a compound of the formula

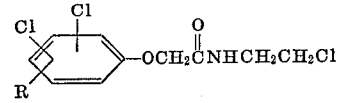

wherein R is hydrogen or chlorine, which comprises reacting a chlorophenoxyacetyl chloride of the formula

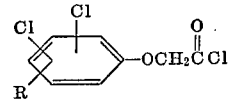

wherein R is as aforesaid, with 2-oxazolidone at a pH less than about 7.0 and wherein the reaction is maintained at a temperature within the range of about 89–150° C.
5. The process of claim 4 wherein the pH is maintained below about 3.0.
6. The process of claim 4 wherein the reaction temperature is maintained above the melting point of 2-oxazolidone.
7. The process of claim 4 wherein said compound is N-(2-chloroethyl)-2,4-dichlorophenoxyacetamide.

References Cited

UNITED STATES PATENTS 2,504,477   1950   Weber et al.   260—559

HENRY R. JILES, Primary Examiner
H. I. MOATZ, Assistant Examiner

U.S. Cl. X.R.
71—118; 260—307